United States Patent [19]

Izzard et al.

[11] 4,376,218
[45] Mar. 8, 1983

[54] ORGANIC PEROXIDE COMPOSITIONS

[75] Inventors: Keith J. Izzard, Dunstable; Reginald W. Stephenson; Keith C. P. Stanistreet, both of Warrington; Iain R. Keeling, Chester, all of England

[73] Assignee: Interox Chemicals Limited, London, England

[21] Appl. No.: 254,164

[22] Filed: Apr. 14, 1981

[51] Int. Cl.³ ............................................ C07C 179/00
[52] U.S. Cl. .................................. 568/559; 252/426; 260/502 R; 568/566
[58] Field of Search ............... 568/559, 561, 566, 558; 260/502 R, 453 RZ, 545; 252/186

[56] References Cited

U.S. PATENT DOCUMENTS

| Re.28,818 | 5/1976 | Eymans et al. | 568/559 |
|---|---|---|---|
| T998,005 | 9/1980 | Orwoll et al. | 568/559 |
| 2,927,084 | 3/1960 | Wahl | 252/526 |
| 3,326,859 | 6/1967 | Seiner | 260/453 RZ |
| 3,462,370 | 8/1969 | Winter et al. | 568/566 |
| 3,538,011 | 11/1970 | vander Klaauw | 568/559 |
| 3,591,540 | 7/1971 | Praskach | 568/559 |
| 3,702,869 | 11/1972 | Leveskis et al. | 568/559 |
| 3,723,336 | 3/1973 | Eymans et al. | 252/186 |
| 3,806,477 | 4/1974 | Jasper et al. | 568/558 |
| 3,839,216 | 10/1974 | Schreyer et al. | 252/186 |
| 3,847,830 | 11/1974 | Williams et al. | 568/559 |
| 3,956,159 | 5/1976 | Jones | 252/104 |
| 4,051,059 | 9/1977 | Bowing et al. | 252/186 |
| 4,134,850 | 1/1979 | McCrudden et al. | 568/559 |
| 4,151,106 | 4/1979 | Meenen | 568/566 |
| 4,255,277 | 11/1981 | Smearing | 568/559 |

FOREIGN PATENT DOCUMENTS

| 45-8412 | 3/1970 | Japan | 568/559 |
|---|---|---|---|
| 47-31945 | 11/1972 | Japan | 568/559 |
| 1160712 | 8/1969 | United Kingdom | 252/186 |
| 1195083 | 6/1970 | United Kingdom | 252/186 |
| 1532597 | 11/1978 | United Kingdom | 252/186 |
| 194801 | 4/1967 | U.S.S.R. | 568/559 |

OTHER PUBLICATIONS

Kirk-Othmer, "Encyclopedia of Chemical Tech", Ed. 2, vol. 15, pp. 720-783.

Primary Examiner—Werren B. Lone
Attorney, Agent, or Firm—Larson and Taylor

[57] ABSTRACT

A solid organic peroxide composition comprises from 50% to below 70% by weight of a solid organic peroxide, such as benzoyl peroxide, at least 10% preferably at least 15% of a liquid desensitizer such as a liquid ester of phthalic acid, benzoic acid or phosphoric acid, a silicone oil or a liquid chlorinated hydrocarbon and a solid organophilic compound such as a solid ester of phthalic acid, benzoic acid or phosphoric acid a solid chlorinated hydrocarbon or a salt of a higher fatty acid in, preferably, less than 20% by weight. The compositions are particularly insensitive to impact.

15 Claims, No Drawings

ORGANIC PEROXIDE COMPOSITIONS

Organic peroxides are widely used as polymerisation initiators. Due to their generally hazardous nature organic peroxides are made available as compositions containing diluent substances acting as desensitisers. It is known in the art that certain substances having plasticising properties in polymer compositions are also suitable as desensitisers for organic peroxides. The phenomenon of plasticisation is described in detail in Kirk-Othmer Encyclopedia of Chemical Technology, Ed 2, Vol 15, pages 720 onwards which publication gives lists of compounds having plasticising properties and indicates the compatability of particular such compounds, hereafter referred to as plasticisers, with various resins. U.S. Pat. No. 2,927,084 describes the manufacture of lauroyl peroxide pastes using certain plasticisers which are liquid at temperatures between about 0° C. and 40° C., hereafter referred to as liquid plasticisers in contrast to plasticisers which have melting points above 40° C. which are hereafter referred to as solid plasticisers. British patent specification No. 1,532,597 describes the manufacture of diacyl peroxide pastes using certain liquid plasticisers.

Organic peroxide pastes have certain disadvantages, such as a tendency to separate into phases and, due to their viscous nature, tend to give difficulty in measuring out a quantity thereof accurately. Organic peroxide solid composition's therefore tend to be preferred in at least some applications. Organic peroxide compositions having concentrations of from about 50% to below about 70% by weight are often desired since organic peroxide compositions having higher concentrations are generally regarded as being too hazardous in transport and use and those having lower concentrations tend not to be preferred on general dilution grounds. In the range of concentration of from 50% to below about 70% there has hitherto been available commercially only a small range of organic peroxide solid compositions. Liquid plasticisers have been used to produce organic peroxide solid compositions having a concentration of 70% or above. Such compositions are the subject of British Pat. No. 1,160,712 which describes in Example 1 a solid 75% by weight benzoyl peroxide/25% by weight dibutyl phthalate composition and in Example 2 a solid 70% by weight mesityl oxide peroxide/30% by weight dimethyl glycol phthalate composition. At lower concentrations only organic peroxide solid compositions based on solid plasticisers have been described. Such compositions are the subject of British Pat. No. 1,195,083 which exemplifies solid compositions having contents of solid organic peroxides of from 50% to 70% by weight. Such compositions tend in at least some instances to be relatively sensitive to impact and it would be advantageous if organic peroxide solid compositions having compositions in the range of about 50% to about 70% by weight, being in at least some instances relatively insensitive to impact could be produced.

The present invention provides organic peroxide solid compositions comprising at least 50% but below 70% of at least one solid organic peroxide and at least one solid desensitiser comprising an organophilic substance, characterised by containing at least 10% by weight of at least one liquid densitiser.

It is found that the combination of liquid and solid desensitiser gives, to an unexpected degree, relatively impact insensitive compositions.

Preferably, the solid organic peroxide is a diacyl or diaroyl peroxide, a ketone peroxide, a peroxyester of a monocarboxylic or a dicarboxylic acid or an alkylidene diperoxide any of which may be substituted or unsubstituted and may contain aromatic, aliphatic or alicyclic residues.

The solid diacyl or diaroyl peroxide may suitably be, for example di-(p-chlorobenzoyl) peroxide, di-(2,4-dichlorobenzoyl) peroxide, acetyl benzoyl peroxide, or lauroyl peroxide but particularly preferably, it is benzoyl peroxide.

The solid ketone peroxide may suitably be, for example, 1,1'-dihydroxydicyclohexyl peroxide or 3,5-dimethyl 3,5-dihydroxydioxolane 1,2.

The solid peroxyester may suitably be, for example, mono-t-butyl permaleate or di-t-butyl diperphthalate.

The solid alkylidene diperoxide may suitably be, for example, 1-hydroxy 1'-hydroperoxydicyclohexyl peroxide or 1,1'-dihydroperoxydicyclohexyl peroxide.

Preferably the liquid desensitiser is a liquid plasticiser. Preferably the liquid plasticiser is an ester of phthalic acid, an ester of phosphoric acid, an ester of benzoic acid, a silicone oil, or particularly preferably, a halogenated, for example chlorinated, hydrocarbon.

The liquid ester of phthalic acid may suitably be, for example, dimethyl phthalate, dibutyl phthalate, dioctyl phthalate or dinonyl phthalate.

The liquid ester of phosphoric acid may suitably be, for example, tributyl phosphate, cresyl diphenyl diphosphate or tricresyl phosphate.

The liquid ester of benzoic acid may suitably be, for example, n-butyl benzoate, methyl benzoate, ethyl benzoate, hexyl benzoate, isobutyl benzoate, or dipropylene glycol dibenzoate.

Preferably, the solid organophilic substance, is a plasticiser.

The solid plasticiser is preferably an ester of phthalic acid, an ester of phosphoric acid, an ester of benzoic acid or, particularly preferably a halogenated, for example chlorinated, hydrocarbon.

The solid ester of phthalic acid may suitably be, for example, dicyclohexyl phthalate or diphenyl phthalate.

The solid ester of phosphoric acid may suitably be, for example, tri-p-toluyl phosphate.

The solid ester of benzoic acid may suitably be, for example, phenyl benzoate, p-t-butylphenyl benzoate, naphthyl benzoate, ethylene glycol dibenzoate, or trimethylene glycol dibenzoate.

The solid plasticiser may, particularly preferably, be a salt of a higher fatty acid, e.g. containing from 10 to 20 carbon atoms. Preferably the salt of the higher fatty acid is a stearate suitably, for example, zinc stearate, zinc(hydroxy) stearate, aluminium stearate or an alkaline earth metal stearate such as calcium stearate or magnesium stearate.

The solid organophilic substance may be in the form of a coating on a solid inorganic substance. The solid inorganic substance may be any inert particulate inorganic material such as, for example, calcium carbonate.

The coating of organophilic substance may, particularly preferably, be in any proportion which gives the coated particle, as a whole, the desired organophilic properties, for example, at least 0.5%, preferably from 1% to 10% by weight of the inorganic substance. The solid inorganic substance may be coated by contacting a moving mass thereof with the organophilic material in molten form followed by cooling to solidify the coating. Alternatively the solid inorganic material may be coated by precipitation thereon, in a liquid medium, and by chemical or physical means, of the solid organophilic material or a precursor thereof followed by separation from the liquid medium and drying.

The compositions according to the present invention may contain the solid organic peroxide in, preferably, at least 55%, particularly preferably in at least 58% by weight, and in less than 69%, particularly preferably less than 68% by weight.

The composition according to the present invention preferably contains the liquid desensitiser in at least 15%, particularly, preferably at least 20% by weight, and preferably in not more than 32% particularly preferably not more than 30% by weight.

Preferably, the composition according to the present invention contains the solid organophilic substance in at least 5% and more preferably in at least 8% for example, very suitably at least 10% by weight. Preferably the composition according to the present invention contains the solid organophilic substance in less than 20% by weight although, where the solid organophilic substance is a salt of a higher fatty acid, either as such or as a coating on an inorganic substance an even higher quantity may be found to be usable. With reference to the use of a coated inorganic substance the quantities stated herein are the total quantities of inorganic substance and the solid organophilic substance.

Within the essential and preferred proportions stated herein it may be necessary to use suitable combinations to avoid the formation of pastes. In the case, for example, of a composition containing 50% by weight of organic peroxide it would be quite possible to include such a relatively large proportion of liquid desensitiser and such a relatively small proportion of solid organophilic substance that a paste would result. It is envisaged according to the invention, however, that for a given desired proportion of the organic peroxide in the composition the relative proportions of the liquid desensitiser, subject to its essential minimum quantity of 10% by weight of the composition, and of the solid organophilic substance are so selected that a solid composition results.

According to a further, preferred, aspect of the present invention there are provided solid compositions containing the solid organic peroxide in from 50% to below 70% by weight, the liquid desensitiser in from 15% to 30% by weight, and the solid organophilic substance in from 8%, very suitably in at least 10% by weight.

Since water is often an undesired material in polymerisation processes the water content of the compositions according to this invention is, preferably, less than 2.0% by weight. Traces of water may be present as a result of the manufacture of the organic peroxide in an aqueous medium and, if not objected to from an application viewpoint, may, suitably, be present in from 0.05% to less than 1%, for example from 0.1% to 0.8% by weight.

The compositions according to the present invention may contain minor amounts of other substances such as, for example, pigments or other additives known in the art without departing, however, from the proportions of solid organic peroxide, liquid desensitiser and solid organophilic compound stated herein.

The compositions according to the present invention may be produced either by introducing the liquid desensitiser, undiluted or as a dispersion in water, and the solid organophilic substance i.e. the solid desensitiser, separately or simultaneously, into a moving mass of the solid organic peroxide for example an aqueous slurry followed by removal of the water.

More specifically, the following process steps are preferably used
 (1) Form an aqueous slurry of the organic peroxide
 (2) Mill the slurry e.g. in a colloid mill
 (3) Gradually add the liquid densensitiser to the milled slurry with agitation
 (4) Gradually add the solid organophilic substance to the slurry with agitation.
 (5) Filter
 (6) Tray dry Steps (3) and (4) may be conducted in either order or simultaneously but are preferably conducted consecutively in ascending number order.

The invention will now be illustrated by means of Examples 1 to 17 of which Examples 1 to 3, 9, 12 and 17 are not according to the invention, but are for comparative purposes.

In each of Examples 1 to 8 and 10 to 16 the above-described process was used to produce the compositions the relevant details being as follows:

1. An approximately 20% by weight slurry, prepared by addition of water-damped organic peroxide, containing 25% by weight of water to a suitable quantity of agitated demineralised water, was passed through a colloid mill set at approximately 0.1 mm.
2. Liquid desensitiser, either neat or as a 50% by volume dispersion in demineralised water, was gradually added with agitation to the milled benzoyl peroxide slurry at ambient temperature over a period of from 1 to 10 minutes.
3. The resulting mixture was stirred for from 1 to 10 minutes.
4. The solid organophilic substance was added to the agitated mixture over a period of from 1 to 10 minutes.
5. The resulting mixture was agitated for a further 1 to 30 minutes.
6. The product was then filtered off and left to drain for 2 to 4 hours.
7. The product was then spread onto trays and dried to a water content below 1% by weight in an oven at 35°–40° C. over a period of from 12 to 24 hours.
8. Dry powder was obtained as the final product.

In Example 9 the composition was prepared, because of possible hazard, by including the solid organophilic substance with the organic peroxide when the latter was in the course of manufacture. In the case of Example 17 the composition was obtained commercially.

The physical nature of each composition, that is, whether it was a powder or a paste, was noted and each composition was tested for impact sensitivity by the impact test, described on pages 240–242 of the European Agreement concerning the international carriage of dangerous goods by road (ADR)—Geneva 30 September 1957 and as amended to 1 October 1978, known as the "Fall-hammer Test II" (International Library number ISBN 0 11 550483 4). The impact sensitivity, expressed in Kg cm, was measured for a hammer of known weight by determining the lowest height of drop in cm with which an explosion (E) or decomposition (D) ocurred in at least 1 out of 6 tests. The higher the result is in Kg cm the less impact sensitive the composition. This test is of significance not only for judging composition safety for transport but also because there can be hazard deriving the use of organic peroxide compositions due to impact by equipment, for example the mixing equipment used in the manufacture of polymers.

In the examples the organic peroxide was benzoyl peroxide and the liquid desensitiser except where stated otherwise was a liquid chlorinated hydrocarbon having an average molecular weight of 320 a chlorine content of 49% by weight and a viscosity of 0.8 poises at 25° C. available from the Mond Division of Imperial Chemical Industries Limited under the Trade Name Cerechlor 50LV. It is commented that a range of liquid chlorinated hydrocarbons having chlorine contents of from about 40% to about 70% and average molecular weights of from about 300 to about 1000 and viscosities of from about 0.5 poises to about 6000 poises at 25° C. may be used as liquid desensitisers in the practice of this invention although, preferably the viscosity at 25° C. is from about 0.5 poises to about 225 poises.

In Examples 1-3 no solid organophilic substance was used.

In examples 4-9 the solid organophilic substance was a solid chlorinated hydrocarbon in the form of a powder having an average molecular weight of 1100 and a chlorine content of 70% available under the Trade Name Cerechlor 70 was used and, in Example 8 only, the liquid desensitiser was dimethylphthalate.

In Examples 10-12 the solid organophilic substance was zinc stearate. In Examples 13-16 the solid organophilic substance was calcium carbonate surface coated with 2.6% of calcium stearate expressed as stearic acid, available from the Mond Division of Imperial Chemical Industries Limited as Winnofil SP.

In Example 17 the solid organophilic substance was dicyclohexyl phthalate and no liquid desensitiser was used.

The constituents of each composition, its physical form and the results of the Impact Sensitivity Tests are set out in the following Tables I to V.

In the Tables the following abbreviations are used
Per = Peroxide
Ex = Example
(D) = Decomposition without flame of detonation
(E) = Explosion with weak to strong detonation.

TABLE I

| Ex | Composition % wt Per. | H$_2$O | Desensitiser Liquid chlorinated hydrocarbon | | Physical Solid State | Impact Sensitivity |
|---|---|---|---|---|---|---|
| 1 | 72.2 | 0.1 | 28 | — | Powder | 100–150(D) 150(E) |
| 2 | 69 | 0.4 | 31 | — | Powder | 250–300(D) 300(E) |
| 3 | 67.3 | 0.2 | 33 | — | Paste Chlorinated hydrocarbon | — |
| 4 | 63.1 | 0 | 17.9 | 19 | Powder | 250–300(D) |
| 5 | 65.3 | 0.1 | 19.6 | 15 | Powder | 100–150(D) 150(E) |
| 6 | 64.2 | 0.3 | 25.3 | 9.7 | Powder | 150–200(D) |
| 7 | 57.8 | 0.7 | 23.5 | 18 | Powder | 375(D) 400(E) |
| 8 | 60.2 | 0.8 | Dimethyl phthalate 21.0 | 18 | Powder | 300(D) 300(E) |
| 9 | 60.9 | 0.8 | — | 38.3 | Powder | 66(D) |//

TABLE I-continued

| Ex | Composition % wt Per. | H$_2$O | Desensitiser Liquid chlorinated hydrocarbon | | Physical Solid State | Impact Sensitivity |
|---|---|---|---|---|---|---|
| 10 | 66.1 | 0.1 | 22.8 | 11 | Zinc stearate Powder | 150(D) |
| 11 | 65.8 | 0.2 | 30 | 5 | Powder | 117(D) 150(E) |
| 12 | 60.3 | 0.4 | 35 | 4.6 | Paste Coated Calcium Carbonate | — |
| 13 | 65.2 | 0.1 | 20.1 | 14.6 | Powder | 100–150(D) 150(E) |
| 14 | 60.9 | 0.1 | 24.0 | 15 | Powder | 150–200(D) |
| 15 | 66.2 | 0.1 | 23.7 | 10 | Powder | 150–200(D) |
| 16 | 65.6 | 0.1 | 29.4 | 5 | Powder dicyclohexyl phthalate | 200–250(D) |
| 17 | 50.7 | 0.1 | — | 49.2 | Powder | 25–50(D) 100(E) |

We claim:

1. In a solid, plasticizer-containing, organic peroxide composition comprising at least 50% but below 70% of at least one solid organic peroxide and a plasticizer, the improvement wherein said plasticizer comprises:
    at least one solid plasticizer; and
    at least one liquid plasticizer, said liquid plasticizer being present in an amount of at least 10% by weight, based on the weight of the composition.

2. An improved, solid, plasticizer-containing organic peroxide composition according to claim 1 wherein said solid organic peroxide is selected from the group consisting of diacyl peroxides, diaroyl peroxides, ketone peroxides, peroxyesters of mono or diacarboxylic acids, and alkylidene peroxides.

3. A solid organic peroxide composition according to claim 1 wherein said solid organic peroxide is selected from the group consisting of diacyl peroxides and diaroyl peroxides.

4. An improved, solid, plasticizer-containing organic peroxide composition according to claim 3 wherein said solid organic peroxide comprises benzoyl peroxide.

5. An improved, solid, plasticizer-containing organic peroxide composition according to claim 2 wherein said solid plasticizer is selected from the group consisting of esters of phthalic acid, esters of phosphoric acid, esters of benzoic acid, halogenated hydrocarbons, and salts of higher fatty acids.

6. An improved, solid, plasticizer-containing organic peroxide composition according to claim 1 wherein said solid plasticizer comprises a coating thereof on a solid inorganic substance.

7. An improved, solid, plasticizer-containing organic peroxide composition according to claim 2 wherein said liquid plasticizer is selected from the group consisting of esters of phthalic acid, esters of phosphoric acid, esters of benzoic acid, silicone oils, and halogenated hydrocarbons.

8. An improved, solid, plasticizer-containing organic peroxide composition according to claim 1 wherein said solid peroxide is present in an amount of at least 55% by weight.

9. An improved, solid, plasticizer-containing organic peroxide composition according to claim 8 wherein said solid peroxide is present in an amount of less than 69% by weight.

10. An improved, solid, plasticizer-containing organic peroxide composition according to claim 9 wherein said liquid plasticizer is present in an amount of at least 15% by weight.

11. An improved, solid, plasticizer-containing organic peroxide composition according to claim 10 wherein said liquid plasticizer is present in an amount of at least 20% by weight.

12. An improved, solid, plasticizer-containing organic peroxide composition according to claim 1 wherein said liquid plasticizer is present in an amount of up to 32% by weight.

13. An improved, solid, plasticizer-containing organic peroxide composition according to claim 1 wherein said solid plasticizer is present in an amount of less than 20% by weight.

14. An improved, solid, plasticizer-containing organic peroxide composition according to claim 13 wherein said solid plasticizer is present in an amount of at least 5% by weight.

15. An improved, solid, plasticizer-containing organic peroxide composition according to claims 1, 2, 3, 4, 5 or 7 wherein said solid plasticizer is present in an amount of at least 5% but less than 20% by weight and wherein said liquid plasticizer is present in an amount of up to 32% by weight.

* * * * *

UNITED STATES PATENT AND TRADEMARK OFFICE
CERTIFICATE OF CORRECTION

PATENT NO. : 4,376,218
DATED : March 8, 1983
INVENTOR(S) : Izzard et al

It is certified that error appears in the above-identified patent and that said Letters Patent are hereby corrected as shown below:

In the title page, left hand column, after item "[22]" and before item "[51]", the following item should be entered:

-- [30] Foreign Application Priority Data
April 26, 1980 United Kingdom 80 13878 --.

Signed and Sealed this

Thirtieth Day of August 1983

[SEAL]

Attest:

GERALD J. MOSSINGHOFF

Attesting Officer

Commissioner of Patents and Trademarks